April 14, 1970     T. L. MEROLLA     3,505,737
FLUID SUBSTITUTION DEVICE
Original Filed May 7, 1964
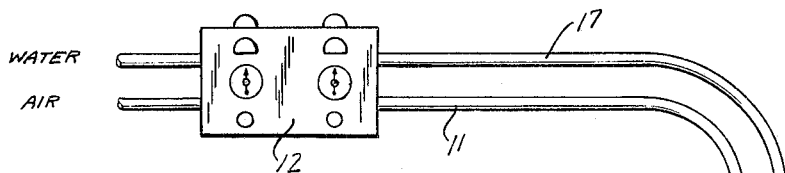
FIG. 1
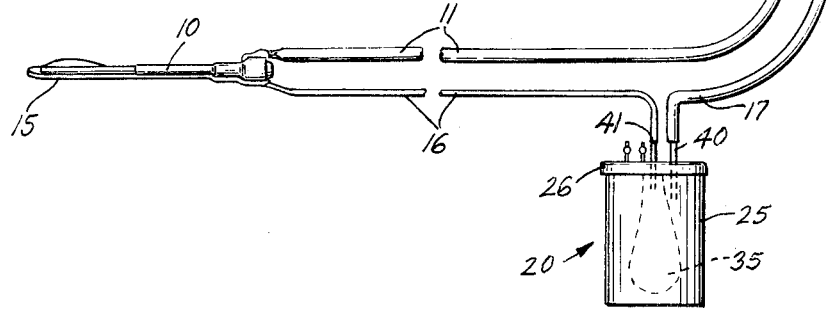
FIG. 2     FIG. 3
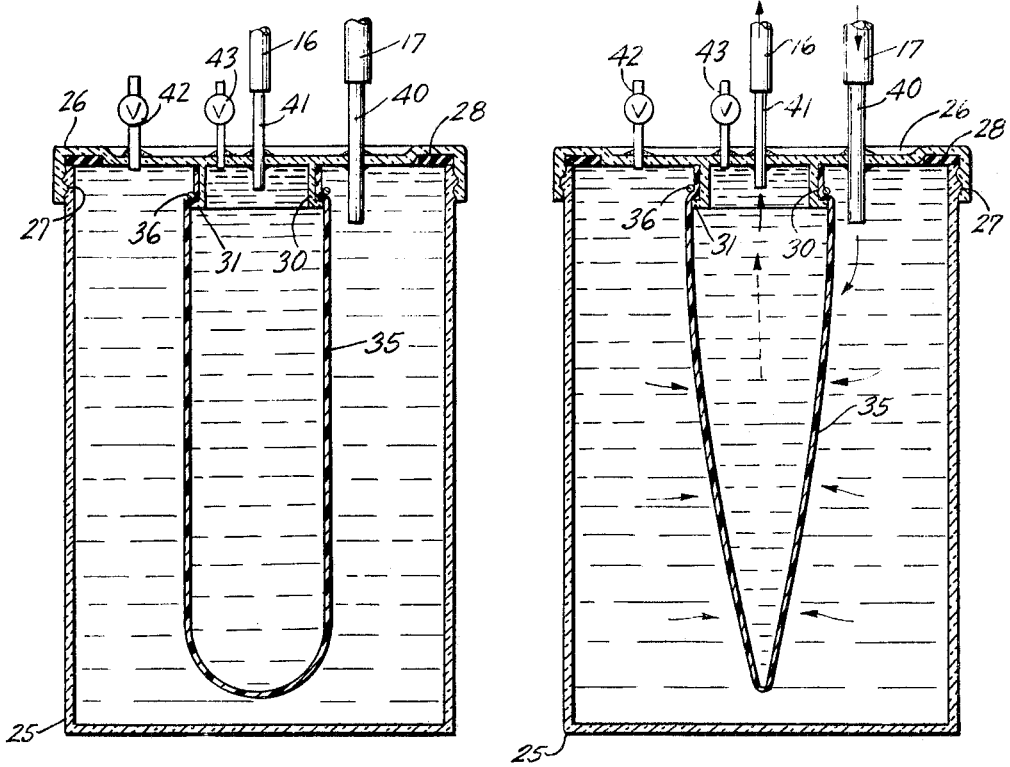
INVENTOR.
THEODORE L. MEROLLA
BY
Greer Maréchal, Jr
ATTORNEY

United States Patent Office 3,505,737
Patented Apr. 14, 1970

3,505,737
FLUID SUBSTITUTION DEVICE
Theodore L. Merolla, Old Greenwich, Conn. 06830
Continuation of application Ser. No. 365,712, May 7, 1964. This application Oct. 2, 1967, Ser. No. 672,391
Int. Cl. A61c 1/08
U.S. Cl. 32—28
2 Claims

ABSTRACT OF THE DISCLOSURE

Dental drilling apparatus for supplying liquid to the drilling area for the cooling thereof and for removal of debris therefrom. The rate of flow and volume of said liquid is delivered in response to the operation of the drill therefor by displacement of said liquid to be fed by a second entirely segregated liquid. The liquid is delivered from a rigid container having a removable lid, an inlet, an outlet, and a flexible inner container disposed in said first container. The liquid is delivered through the outlet of said container. A second liquid, in volumetric equivalence to the amount of said first liquid delivered to said drilling area, is fed into said container and displaces the liquid removed through said outlet. The first container is completely closed against escape of liquid other than through the inlet and outlet, except for bleeder means.

---

This application is a continuation of copending application Ser. No. 365,712 filed May 7, 1964, now abandoned.

This invention relates to devices for substituting one flowing liquid for another while maintaining the liquids completely separated and, more particularly, to such devices having provisions for automatically effecting the substitution under controlled conditions where the volume and rate of flow of the substitute liquid is automatically maintained at exactly the same as those of the flowing liquid being substituted.

As will be understood, there are a variety of instances and applications in which it may be desired to substitute one flowing fluid for another in a closed system and/or have the flow of one fluid induced or forced by the flow of another fluid under circumstances where the two fluids are kept completely separated. Among such applications might be noted sucking a fluid into a collapsed flexible container by evacuating the area outside such container and/or forcing fluid out of an expanded flexible container by applying air or other pressure to the outside thereof.

In these and other similar devices—such as flexible diaphragm feeding devices actuated by air or hydraulic or mechanical pressure, etc.—and especially where the fluid which induces the flow of the substitute fluid is itself a compressible gas or vapor, the rate and/or volume of flow of the substitute fluid may not be directly and exactly related or equated to the rate or volume of flow of the driving fluid, and the rate or pressure or volume of the driving fluid necessary to evolve a given rate or volume of substitute fluid from the device may vary substantially during use and in accordance with how nearly full or nearly empty the device may be.

In other substitutions, however, and particularly those noted as illustrative in the following description, it may be desired to have a direct and exactly equivalent (not merely proportional) relationship between the rate and/or volume of the driving fluid with the rate and/or volume of the substitute fluid being delivered by the device. Similarly, it may also be important that such equivalency or rate control be both positive and automatic, as well as independent of reliance on either compressible gases or atmospheric pressure. Additionally, particularly with certain surgical, medical, or dental applications as described below, it may be desired that the entire device not only be readily subject to surgical sterilization but also maintain absolute sterile separation between the two liquids therein.

According to this invention, then, there are provided means and devices for substituting one liquid for another and under circumstances where the flow of the substitute liquid is induced by and automatically regulated as to rate and volume to be exactly equal to the flow of another liquid; yet under circumstances where absolute and sterile separation between the two liquids is maintained and with structures which are simple and economical to manufacture and, if desired, readily sterilizable for surgical or medical or dental use. Included herein are devices comprising a flexible inner container for holding the substitute liquid to be dispensed and arranged within an outer container into which the driving liquid flows, with sealing and other arrangements whereby inflow of driving liquid into the outer container dispenses from the flexible inner container by collapsing it the substitute liquid contained therein at exactly the flow rate and volume at which the driving liquid flows into the outer container. As a further feature of this invention, there are also provided arrangements and constructions particularly adapted to providing automatically controlled sterilized flow of liquids for surgical and dental operations, as well as sterile liquid substitution devices for uses in such medical applications as withdrawing blood from a human being, etc.

With the foregoing and additional objects in view, this invention will now be described in more detail, and other objects and advantages thereof will be apparent from the following description, the accompanying drawings, and the appended claims.

In the drawings:

FIG. 1 is a somewhat diagrammatic or schematic illustration of a device embodying and for practicing this invention as applied to the washing liquid flow line of a high speed dental drill;

FIG. 2 is a vertical axial section through a liquid substitution device embodying and for practicing this invention and showing the device full and ready to begin operation; and FIG. 3 is a view similar to FIG. 2 showing the device in use and with the substitute liquid partially dispensed.

Merely as illustrative of a particularly useful application to which a device embodying and for practicing this invention may be put, one may note the well known type of high speed (e.g., more than 250,000 r.p.m.) air-turbine dental drills. As well understood, such drills require that a small stream of water or other washing liquid be ejected through a nozzle adjacent the drill burr for the purpose of washing debris from the tooth being cut, as well as to aid in avoiding excessively high temperatures. With such drills, the flow of such washing liquid is controlled in a main control device remote from the drill, along with the air which drives the drill, etc., and water is conventionally the washing liquid, it being important that the rate of delivery and flow of the washing water be correlated and controlled with the same control mechanism which controls the driving air pressure and speed.

In many locations, the regular city water supply is sufficiently "hard" or has a sufficiently high mineral content that deposits therein may readily and frequently clog or plug the water nozzle on the dental drill, requiring stopping to clean the nozzle, frequently in the midst of a drilling operation. In such instances, it may be useful to have a device embodying this invention which will substitute for the city water supply (without requiring rearrangement or even redesigning of the principal control equipment or plumbing thereto) distilled water for the city water supply and under circumstances where the city water flow under the conventional dental drill control will itself induce an exactly equivalent rate and volume of distilled water flow to the wash nozzle on the drill.

More importantly, such high speed dental drills are recognized as being particularly efficacious also in bone surgery. Indeed, a cut through bone made with such high speed drills heals more readily than with conventional surgical bone drills because the drill is so fast that the edges of the cut are not burnished as occurs with conventional drills of lower speeds. Yet, the use of such advantageous equipment in bone surgery has previously been limited or impossible because of the necessity of maintaining absolute surgical sterility (more than is necessary in dentistry). Thus, as well understood, the use of city water (or even distilled water) for the drill washing stream is virtually precluded with bone surgery, and subjectng the entire water hose and drill and the remote control equipment for the water flow to surgical sterilization or maintaining adequate surgical sterility throughout all such apparatus is virtually impossible.

Accordingly, a useful application of apparatus embodying and for practicing this invention is in providing a surgically sterile container of sterile disinfectant as the substitute liquid, which is delivered to the washing liquid nozzle in the incision or cut being made by the normal washing water flow or as controlled by the drill control, and yet with the two liquids absolutely separate and surgical sterility maintained, while the sterile disinfectant is delivered to the drill at exactly the same rate and volume as regular washing water would be so delivered under the master control and without rebuilding or redesigning the conventional high speed drill to convert it for this additional applicability to sterile surgical techniques.

As further illustrative of the useful applications of this apparatus embodying this invention, one may note a further medical use solving a problem which may become more acute under certain circumstances. That is, in such medical activities as obtaining blood from a donor for a blood bank, it is important, as well understood, that the blood be withdrawn quite slowly so as to avoid a rapid or precipitous drop in liquid content of the arterio-vascular system which might produce harmful or adverse effects merely from the diminution of volume of liquid in the system. Utilizing apparatus embodying and for practicing this invention, however, physiological normal saline solution (or other physiologically innocuous fluid) may be introduced into a vein of a blood donor at exactly the same rate and volume as blood is withdrawn from the donor's artery, and, actually with the withdrawn blood automatically controlling the rate and volume of injected liquid. In this manner the total volume in the arterio-vascular system can be maintained exactly constant, and, accordingly, the desired blood withdrawal may be accelerated to a substantially faster rate and shorter time.

Referring to the drawing, in which like reference numerals refer to like parts throughout the several views thereof, there is illustrated an arrangement of apparatus or device embodying and for practicing this invention and as illustrative of devices for accomplishing such useful objectives as those indicated above.

Thus, in FIG. 1 there is shown a conventional high speed air-turbine dental drill 10 having an air supply hose 11 for supplying driving air to the drill under the control of conventional air power and control devices, as well understood, indicated diagrammatically as being disposed in control unit 12 in known manner. Also in known manner, there is disposed on drill 10 a washing liquid conduit 15 terminating in a nozzle adjacent the working end of the drill for directing a stream of washing liquid directly into the cut being made for removal of debris therefrom and for cooling effect, which conduit 15 is fed with washing liquid through a flexible tube or hose 16. As is conventional, control unit 12 also includes means for supplying and controlling flow of washing water delivered toward the drill through hose 17, whenever the drill is running and at the desired (or even adjustable) volume and flow rate to accomplish the necessary washing and cooling as such water is ejected out of the end of washing liquid conduit 15 on drill 10.

In the arrangement illustrated in FIG. 1, a liquid substitution device is indicated generally at 20 as being interposed in the line of flow of washing water through hose 17 so that the flow of washing water through hose 17, as controlled by unit 12, enters device 20 and ejects therefrom, as described below, distilled water or disinfectant liquid contained in device 20 and at exactly the same rate and volume as water flows through hose 17. The disinfectant is ejected through hose 16 and into washing liquid conduit 15 on drill 10.

Merely as illustrative of apparatus or devices embodying and for practicing this invention to accomplish the liquid substitution as desired, the structure of substitution device 20 is illustrated in more detail in FIGS. 2 and 3, where the arrangement is shown as including an outer container 25, of plastic or glass or metal as may be desired or required depending upon the use to which the device will be put, etc., having a top closure or lid 26 removably secured thereto, as by a threaded connection indicated at 27, and preferably including a liquid sealing arrangement 28 to provide a liquid-tight seal when lid 26 is in place on container 25.

Affixed to the underside of lid 26 is a cylindrical flange 30 having an outwardly extending lip 31. A flexible bag 35 (of polyethylene or other plastic material or other impervious flexible materials as may be desired or required depending upon the liquids involved) is removably affixed around flange 30—in the illustrated arrangement, as by fitting around the flange with a spring wire or elastic band or clip 36 closing the top of bag 35 tightly around flange 30 above lip 31 thereof. As will be understood, a wide variety of other means for removably affixing bag 30 as an inner container within outer container 25 and in liquid-tight manner to lid 26 thereof are also satisfactory provided only that an absolutely liquid-tight closure is maintained to prevent any leakage or liquid flow communication or interminging of liquid within inner contaner 35 with liquid outside the inner container and within outer container 25.

Penetrating lid 26 in liquid-tight manner and in an area thereof outside the area of flange 30 is an inlet tube 40 communicating with that portion of outer container 25 surrounding inner container 35, and, as illustrated, with water hose 17 connected to inlet 40. Penetrating lid 26 in liquid-tight manner but within the area of flange 30 so as to communicate with the inside of inner container 35 is an outlet tube 41, to which is connected hose 16 leading to washing liquid conduit 15 on drill 10. Preferably there are also provided through lid 26 air bleeding valve arrangements indicated at 42 and 43 communicating, respectively, with the portion of container 25 outside inner container 35 and with inner container 35, in such manner that both the inner and outer containers can be completely filled with liquid while using bleeding valves 42 and 43 to remove air bubbles from the top of the filled containers.

In the operation of the illustrated device, as will be apparent from the foregoing, inner container or bag 35 is placed in position as shown in FIG. 2 and is filled (as by utilizing outlet tube 41) with whatever substitute liquid is desired (e.g., distilled or sterile water, a disinfectant liquid such as zephrin chloride, normal saline solution, etc.), and outer container 25 is filled with water, whereupon lid 26 is fastened into place so that the arrangement is as in FIG. 2, utilizing bleeding valves 42 and 43 to remove air bubbles from the top of both closed containers. Thus, with the device as arranged in FIG. 2 and connected as in FIG. 1, operation of drill 10 is undertaken as conventionally, during which water is pumped at an adjusted or controlled rate and volume through hose 17 as controlled by unit 12.

This water flow enters outer container 25 around the outside of inner container 35. Since container 25 is already completely filled with liquid, additional water entering the container through hose 17 and inlet 40 displaces an equivalent volume of substitute liquid from inside flexible bag 35, which liquid is discharged through outlet 41 and carried by hose 16 to washing liquid conduit 15 on drill 10—all as illustrated somewhat diagrammatically in the FIG. 3 showing of the device of FIG. 2 in use and with part of the substitute fluid from inner container 35 having been ejected. As will be apparent, both the rate and volume of fluid ejected from inner container 35 is equal to the amount of liquid forced into outer container 25 under the action of the pump and control mechanism in unit 12 since there is a direct displacement because of the incompressability of liquids and the sealed closure of container 25.

As will be apparent from the foregoing, the inner container 35, the entire lid 26, and the shorter length of hose 16, along with drill 10, are readily susceptible to surgical sterilizing techniques, and the sterility thereof is readily maintained in a surgical operating room, whereas the entire hose 17 and pumps and controls in unit 12 would not be readily sterilizable. Similarly, the arrangement illustrated maintains the acceptable sterile isolation of the substitute liquid in inner container 35 as well as the outer surfaces of lid 26 and container 25 as would be necessary for positioning the container in the sterile surgical field closely adjacent to point of use of drill 10, and completely notwithstanding the fact that water being forced into outer container 25 was not sterile and did not arrive through sterile hoses.

Accordingly, there are provided in accordance herewith extremely simple and economical arrangements and devices for direct and automatically controlled fluid substitution where rate and volume of flow of a substitute fluid is automatically equal to those of the fluid for which substitution is desired, and constructed in a manner which even permits ready sterilization and maintenance of sterility for surgical operation room use. As will also be understood, although the device in the illustrated arrangement was described as substituting a fluid in inner flexible container 35 for one in outer container 25, reverse flow operation of the device also gives satisfactory results, and intermittent reversing of the direction of flow is thus possible in applications where that may be desired.

For example, for such medical uses, noted above, as substituting normal saline solution during blood withdrawal, outer container 25 is completely filled with such normal saline solution and to an extent which completely collapses inner container 35, and inlet 41 into inner container 35 is connected to a conventional blood withdrawing tube and hypodermic needle inserted into the patient's artery, while outlet 40 from outer container 25 is similarly connected into the patient's vein in a downstream flow direction. Therefore, as blood is withdrawn from the patient's vein and enters inner container 35 expanding it upon being filled, such expansion of originally collapsed inner container 35 will expel or dispense from outer container 25 and through outlet 40 thereof an exactly equivalent volume of normal saline into the patient's artery. In this manner, the total volume of fluid in the patient's arterio-vascular system is maintained substantially constant notwithstanding the withdrawal of a substantial amount of blood into inner container 35.

Similarly, as noted above, and for use in a variety of other applications which will recommend themselves to men skilled in the medical and surgical arts as well as other areas in which such liquid substitution devices may be useful, complete or partial flow in either direction is readily induced, with automatically maintained equivalency of volume and flow rate, into or from either collapsible inner container 35 or outer container 25 depending only upon the selection of whether flow to the device is through the inlets-outlets 40 or 41 and completely under the control of whatever external flow control mechanism may normally be utilized in each instance.

As will be apparent, the particular sizes and capacities of inner container 35 and outer container 25 are readily selected to accommodate the particular exigencies of the applications in which the devices are to be utilized. For example, for exclusively dental work, the sizes and capacities can be quite large so that a full day's supply (or even more) may readily be accommodated. For surgical work, on the other hand, the apparatus can be made quite compact and thus more easily handled and sterilized in view of the fact that such high speed drills may be used for only a few seconds or a small fraction of a minute in drilling through even rather thick bone structure. Similarly, the relative sizes of inlets-outlets 40 and 41 as well as auxiliary or bleeder passages 42 and 43, are readily selected depending on the requirements of uses to which the device may be put, and the valving arrangements thereof are to be understood as including any variety of valves, stop cock, or pinch clamp structure.

What is claimed is:

1. In a dental drilling apparatus of the character described means for supplying liquid to the drilling area for the cooling thereof and for the removal of debris therefrom wherein the rate of flow and volume of said liquid is delivered in response to the operation of the drill therefor by the displacement of said liquid to be fed by a second entirely segregated liquid, the combination which comprises a dental drill having a liquid nozzle disposed thereon, a control unit connected to said drill for the control thereof, an outer container, a removable lid for said container having an inlet and an outlet, a flexible inner container disposed in said first container sealably engaging said outlet with the interior thereof being in flow communication with said outlet, bleeder means leading from the interior of both said containers to the atmosphere for the displacement of air therein by said liquids placed therein, first conduit means leading from said control unit to said inlet providing flow communication therebetween, and a second conduit means leading from said outlet to said nozzle at said drill, whereby when said outer container is filled with said second liquid and said inner container is filled with said liquid to be fed, said control unit in response to the operation of said drill will deliver a controlled volume of the said second liquid to said inlet and into said outer container causing the liquid therein to move against said flexible inner container displacing from the interior thereof an equal volume of liquid therein out said outlet through said nozzle to the drilling area, said first container being completely closed against escape of said second liquid therefrom during said feeding of said additional volume of said second liquid into said first container.

2. Apparatus as recited in claim 1 which includes a cylindrical flange affixed to the underside of said lid for the attachment thereto of said flexible container, clamp means for attaching said flexible container to said flange in liquid-tight seal, and in which said lid has a seal therearound for liquid-tight engagement with the periphery of the top edge of said first rigid container.

References Cited

UNITED STATES PATENTS

| | | | |
|---|---|---|---|
| 2,563,211 | 8/1951 | Cassese | 137—564.5 |
| 2,865,388 | 12/1958 | Sternbergh. | |
| 3,052,525 | 9/1962 | Vogelmann. | |
| 3,095,892 | 7/1963 | Laing. | |
| 3,129,511 | 4/1964 | Williams. | |
| 3,225,759 | 12/1965 | Drapen | 137—564.5 |

ROBERT PESHOCK, Primary Examiner